(12) United States Patent
Adibi et al.

(10) Patent No.: US 7,515,319 B2
(45) Date of Patent: Apr. 7, 2009

(54) LENS-LESS SPECTROMETER

(75) Inventors: Ali Adibi, Suwanee, GA (US); Chao Ray Hsieh, Atlanta, GA (US); Arash Karbaschi, Smyrna, GA (US); Omid Momtahan, Foothill Ranch, CA (US)

(73) Assignee: Georgia Tech Research corp., Atlanta, GA (US)

( * ) Notice: Subject to any disclaimer, the term of this patent is extended or adjusted under 35 U.S.C. 154(b) by 50 days.

(21) Appl. No.: 11/459,114

(22) Filed: Jul. 21, 2006

(65) Prior Publication Data
US 2007/0019263 A1  Jan. 25, 2007

Related U.S. Application Data

(60) Provisional application No. 60/701,872, filed on Jul. 22, 2005.

(51) Int. Cl.
*G02B 5/32* (2006.01)
*G01J 3/28* (2006.01)

(52) U.S. Cl. .................. 359/19; 359/15; 359/900; 356/328

(58) Field of Classification Search .............. 359/15
See application file for complete search history.

(56) References Cited

U.S. PATENT DOCUMENTS 6,163,391 A * 12/2000 Curtis et al. ................... 359/29
6,958,967 B2 * 10/2005 Kasazumi et al. ............ 369/103

OTHER PUBLICATIONS

Stroke, George W., Lensless Fourier-Transform Method for Optical Holography, Mar. 1965, Applied Physics Letters, vol. 6, No. 10, p. 201-203.*
Karbaschi, Arash et al., Qualitative Demonstration fo Spectral Diversity Filtering Using Spherical Beam Volume Holograms, Jun. 28, 2004, Optics Express, vol. 12, No. 13, p. 3018-3024.*

* cited by examiner

*Primary Examiner*—Arnel C Lavarias
*Assistant Examiner*—Jade Callaway
(74) *Attorney, Agent, or Firm*—Thomas, Kayden, Horstemeyer & Risley, LLP; Todd Deveau

(57) ABSTRACT

A lens-less system for analyzing an optical spectrum includes a sophisticated volume hologram for separating an incident diffuse optical signal into wavelength channels without aid of an external collector lens and a detector for receiving and detecting light dispersed by the sophisticated volume hologram. Other systems and methods are also provided.

14 Claims, 5 Drawing Sheets

LENS-LESS SPECTROMETER

CROSS-REFERENCE TO RELATED APPLICATION

This application claims priority to copending U.S. provisional application entitled, "Lens-less Fourier Transform Volume Holographic Spectrometer," having Ser. No. 60/701,872, filed Jul. 22, 2005, which is entirely incorporated herein by reference.

STATEMENT REGARDING FEDERALLY SPONSORED RESEARCH OR DEVELOPMENT

This invention was made with Government support under Grant No. NO1AA23013, awarded by the National Institutes of Health. The Government has certain rights in this invention.

TECHNICAL FIELD

The present disclosure is generally related to optical spectrum measurements and, more particularly, is related to spectrometers.

BACKGROUND

Compact, portable, efficient, and low-cost spectrometers are of high interest in biological and environmental sensing. A conventional spectrometer generally has the following parts: a collimator; a wavelength dispersive medium; a collector; and a detector.

In conventional spectrometers, gratings are commonly used as wavelength dispersive media and can separate wavelength channels of a spatially coherent incident beam very well. However, a spatially incoherent beam consisting of multiple spatial modes results in the spatial overlap of multiple wavelength channels in the output plane of the grating. To avoid this problem, a collimator which is composed of a narrow slit and a lens (or a concave mirror) is placed in front of the grating. A main drawback of this arrangement is the low throughput as the slit blocks most of the input power. Increasing the slit width to improve the throughput results in less resolution. This trade-off between resolution and throughput is another disadvantage of a conventional spectrometer.

To improve the efficiency of the spectrometer and to make the spectrometer more compact, a Fourier-transform volume holographic (FTVH) spectrometer integrates the collimator (the slit and lens in front of the grating) and the grating into a spherical beam volume hologram (SBVH) recorded in a holographic material by the interference of a plane wave and a spherical beam. When the SBVH is read by a plane wave from the direction of the recording spherical beam, the diffracted beam has a crescent shape due to partial Bragg matching. The position of the crescent at the back face of the volume hologram depends both on the reading wavelength and on the direction of the reading plane wave. This effect results in considerable crosstalk between different incident wavelength channels when the reading beam is spatially incoherent (e.g., several incident angles) with multiple wavelengths.

To solve this ambiguity, a Fourier-transform lens (that plays the same role as the collector in conventional spectrometers) is placed behind the hologram so that all diffracted crescents corresponding to different incident angles but the same incident wavelength overlap at the same location in the Fourier plane. Therefore, the position of the Fourier spectrum of the crescents only depends on the incident wavelength, which is highly desirable for diffuse source spectroscopy. One advantage of the FTVH spectrometer is that the diffuse source can be placed right in front of the SBVH without any input coupling, which reduces the alignment requirements. Further, since no slits and lens are required in front of the hologram, the FTVH spectrometer is more compact than the conventional ones. However, the Fourier-transform lens behind the hologram is still essential for this FTVH spectrometer which may be a disadvantage in some applications.

Thus, a heretofore unaddressed need exists in the industry to address the aforementioned deficiencies and inadequacies.

SUMMARY

Embodiments of the present disclosure provide systems and methods for a lens-less system for analyzing an optical spectrum. Briefly described, one embodiment of a system includes a sophisticated volume hologram for separating an incident diffuse optical signal into wavelength channels without aid of an external collector lens and a detector for receiving and detecting light dispersed by the sophisticated volume hologram.

Embodiments of the present disclosure can also be viewed as providing methods for implementing the lens-less system. In this regard, one embodiment of such a method, among others, can be broadly summarized by the following steps: producing a spherical beam volume hologram that is recorded by one converging spherical beam and one diverging spherical beam, the spherical beam volume hologram capable of performing a Fourier-transformation on an incident optical signal without aid of an external lens; positioning an input port of the lens-less spectrometer along a direction of the diverging spherical beam; and positioning an output port of the lens-less spectrometer along a direction of the converging spherical beam.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In accordance with the present disclosure, an embodiment of a simple, low-cost and very compact spectrometer for diffuse source spectroscopy using only a volume hologram, recorded by two spherical beams, and a charge coupled detector (CCD) (or other detector device) is presented. In one embodiment, this lens-less Fourier transform volume holographic spectrometer can operate well under spatially incoherent light illumination. The resolution of this spectrometer can be optimized by proper selection of the location of the CCD, in one or more embodiments.

In accordance with the present disclosure, a Fourier-transform lens can be further integrated into a volume hologram by recording the hologram with two spherical recording beams. Since no lens or any optical device other than a volume hologram and a CCD is utilized, this spectrometer is more compact, less costly, less sensitive to input coupling alignment, and potentially more efficient.

Figure 1:
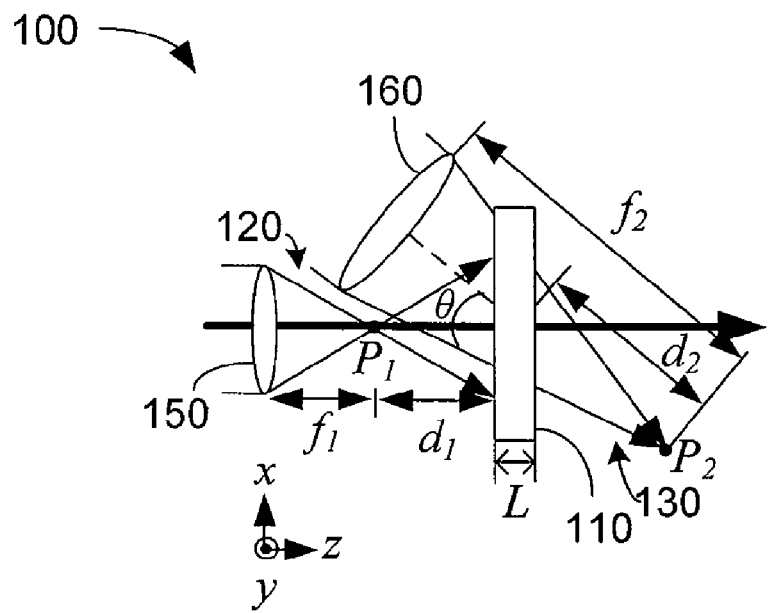
FIG. 1 is a diagram of an exemplary setup for recording a hologram to be used in a lens-less spectrometer in accordance with the present disclosure.

FIG. 1 shows an exemplary setup 100 for recording a spherical beam volume hologram (SBVH), in accordance with one embodiment of the disclosure, by use of a diverging spherical beam 120 and a converging spherical beam 130. The converging recording beam 130 (instead of a plane wave) is used to add a quadratic phase term to the diffracted signal for performing Fourier-transformation without an external lens with respect to the SBVH. In one exemplary embodiment, the diverging spherical beam 120 is formed by focusing a plane wave in front of the recording medium 110 with a lens 150 with focal length $f_1$. The distance between the recording medium and the focal point $P_1$ is $d_1$. The converging spherical beam 130 is formed by focusing a plane wave behind the recording medium 110 with a lens 160 with focal length $f_2$. The distance between the recording medium 110 and the focal point $P_2$ is $d_2$. The angle between the direction of the converging spherical beam and normal to the medium is $\theta$.

Figure 2:
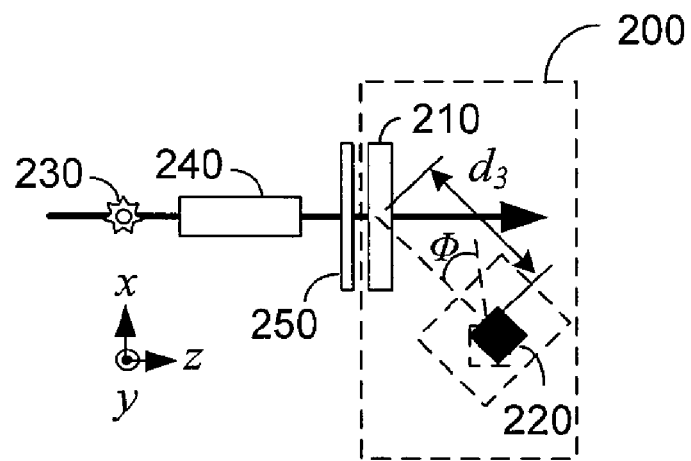
FIG. 2 is a diagram of an exemplary reading setup of an embodiment of a lens-less spectrometer using a hologram produced from the setup of FIG. 1.

FIG. 2 shows an exemplary reading setup 200 for a lens-less spectrometer 200 employing a SBVH 210 produced from the setup of FIG. 1. The hologram 210 is read from the direction of the diverging recording spherical beam and the diffracted beam is in the direction of the converging recording spherical beam (assume that readout is performed at the recording wavelength). The Fourier transform of the diffracted beam pattern (e.g., the crescent) is then automatically obtained at the focal plane of the converging recording spherical wave 130, where a CCD (220) is placed to capture the Fourier spectrum.

In one embodiment, the hologram 210 is a SBVH recorded at $\lambda=532$ nm in a 300 µm thick sample of Aprilis photopolymer using the setup shown in FIG. 1 with $f_1=d_1=d_2=4.0$ cm and $f_2=6.5$ cm. The size of the hologram 210 is 0.7-mm×0.7-mm. Generally, the recording material for the hologram 210 is desired to be as thick as possible, since this means better dynamic range and better Bragg selectivity. In some embodiments, glass or photorefractive crystals may be used as a recording material, instead of polymer materials.

The distance between the CCD 220 and the hologram 210 in FIG. 2 is $d_3$ and the angle between the direction of the diffracted beam and normal to the CCD 220 is $\Phi$. Both $d_3$ and $\Phi$ are tunable for the calibration of this spectrometer 200.

Figure 3:
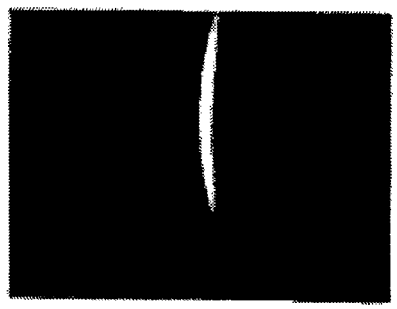
FIG. 3 is a diagram of a diffracted pattern from the hologram recorded in FIG. 1, where the pattern is measured both at the output face of the hologram and at the focal point of the recording converging spherical beam on a charge coupled detector (CCD) when read by a collimated monochromatic beam at the same wavelength as the recording wavelength.

In one embodiment, the SBVH 210 is first read by a monochromatic collimated beam at $\lambda=532$ nm obtained by passing white light 230 through a monochromator 240 shown as in FIG. 2 without the presence of the diffuser 250. The CCD 220 (with 765×510 pixels and a pixel size of 9 µm×9 µm, in an exemplary embodiment) is located at $d_3=4.0$ cm (e.g., at the Fourier plane) and is perpendicular to the diffracted beam (e.g., $\Phi=0°$) in this case. The diffracted beam both at the output face of the hologram 210 and on the CCD 220 has a crescent shape as shown in FIG. 3.

Figure 4:
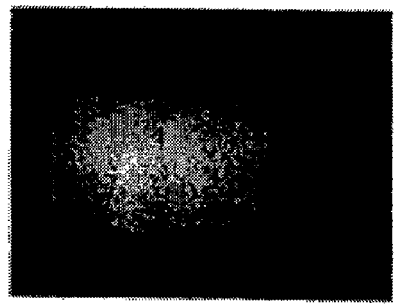
FIG. 4 is a diagram of a diffracted pattern from the hologram recorded in FIG. 1, where the pattern is measured at the back face of the hologram when read by a diffuse monochromatic beam at the same wavelength as the recording wavelength.
Figure 5:
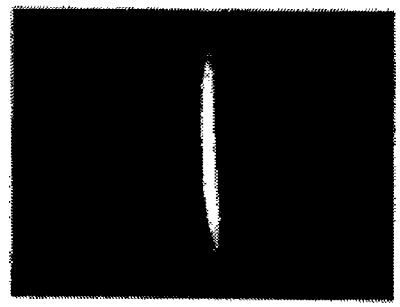
FIG. 5 is a diagram of a diffracted pattern from the hologram recorded in FIG. 1, where the pattern is measured at the focal point of the recording converging spherical beam when the hologram is read by diffuse monochromatic beam at the same wavelength as the recording wavelength.

When the hologram 210 is read by a monochromatic diffuse beam at $\lambda=532$ nm with the presence of rotating diffuser 250 in FIG. 2, the diffracted pattern at the output face of the hologram 110 is a diffuse light having many overlapping crescents shown in FIG. 4. However, the diffracted beam pattern on the CCD 220 has the crescent shape shown in FIG. 5, which is similar to that shown in FIG. 3 except at the edge.

The location of the diffracted crescent at the CCD plane is independent of the reading incident angle (since only one crescent is obtained here). Moreover, the position of the crescent on the CCD 220 depends only on the incident wavelength of the diffuse reading beam.

Thus, this streamlined system acts similar to a standard FTVH spectrometer but without a Fourier-transforming lens. To investigate the effect of the incident wavelength, the wavelength is changed to $\lambda=590$ nm (which is far enough from the recording wavelength $\lambda=532$ nm for this investigation), and the previous procedure is repeated using the setup in FIG. 2 with $d_3=4.0$ cm and $\Phi=0°$.

Figure 6:
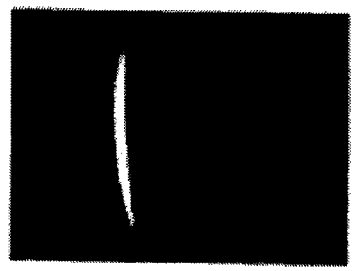
FIG. 6 is a diagram of a diffracted pattern from a hologram of FIG. 1, where the pattern is measured at the focal point of the recording converging spherical beam when the hologram is read by a collimated monochromatic beam at a different wavelength from the recording wavelength.
Figure 7:
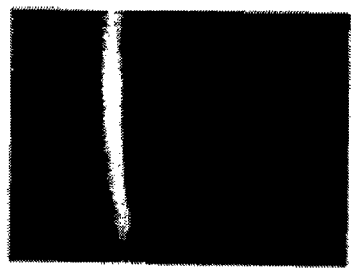
FIGS. 7-8 are diagrams of a diffracted pattern from a hologram of FIG. 1, where the pattern is measured at the focal point of the recording converging spherical beam when the hologram is read by a diffuse monochromatic beam at a different wavelength from the recording wave. The difference between FIGS. 7 and 8 is due to different locations of the CCD.

Accordingly, the SBVH 210 is first read without the presence of the diffuser 250. Here, the diffracted beam pattern on the CCD 220 has a crescent shape, as shown in FIG. 6, located at a different position compared to that in FIG. 3 (obtained at reading wavelength of $\lambda=532$ nm). This clear crescent shape of the diffracted beam is obtained within the wavelength detecting range (~100 nm) for this specific hologram 210 of the spectrometer 200. However, the diffracted beam pattern at the CCD 220 becomes blurred after adding a rotating diffuser 250 in front of the hologram 210, as shown in FIG. 7. The blurring is caused by the imperfect Fourier transformation at wavelength $\lambda=590$ nm at the CCD plane. The Fourier transformation performed by the spherical beam hologram 210 is inherently more wavelength sensitive than that obtained with a regular lens. As a result, the position of the Fourier plane in FIG. 2 depends on the incident wavelength. Therefore, by changing the position of the CCD 220 along the direction of the diffracted beam to $d_3$=3.4 cm, the correct position of the Fourier plane corresponding to $\lambda$=590 nm can be determined and the clear crescent shape of diffracted beam pattern can be retrieved, as shown in FIG. 8.

Figure 8:
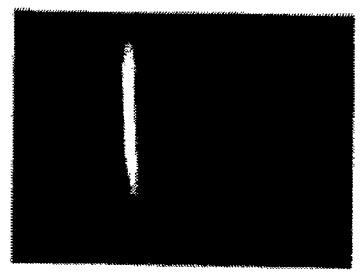

It is determined from FIGS. 6-8 that the position of Fourier plane changes with the incident wavelength and further calibration of the alignment in the lens-less spectrometer may improve resolution (clearest crescent shape or smallest width of crescent) for all wavelengths within the detection range. For example, the resolution of an embodiment of the lens-less spectrometer at different wavelengths may be made similar by choosing the tilt angle $\Phi$ of the CCD appropriately.

To investigate the wavelength dependence of position of the Fourier plane of the SBVH 210, the SBVH 210 is read by monochromatic diffuse light using the setup in FIG. 2 with $\Phi$=0°. For each reading wavelength, the CCD 220 is moved along the direction of the diffracted beam and the full width at half maximum (FWHM) of the diffracted beam pattern (crescent) on the CCD 220 is measured at each position.

Figure 9:
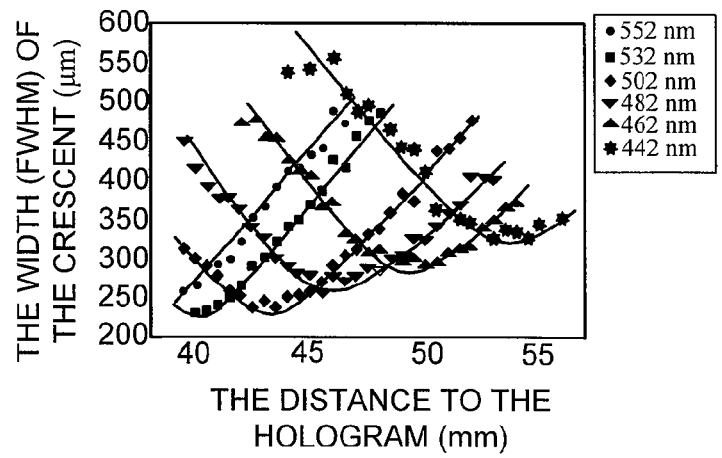
FIG. 9 is a diagram showing the effect of the incident wavelength on the position of the Fourier plane for the lens-less spectrometer of FIG. 2.

FIG. 9 shows the variation of the FWHM of the crescent with the CCD position for different wavelengths in the range of 442 nm to 552 nm. For each wavelength, the CCD position corresponding to the crescent with the minimum FWHM is the Fourier plane where the optimal measurement of that wavelength should be performed. Each curve represents the variation of the FWHM of the crescent at CCD 220 with the position of the CCD ($d_3$ in FIG. 2) at a single wavelength. Based on the data in FIG. 9, the dependence of the position of the Fourier plane on the incident wavelength is shown in FIG. 10.

Figure 10:
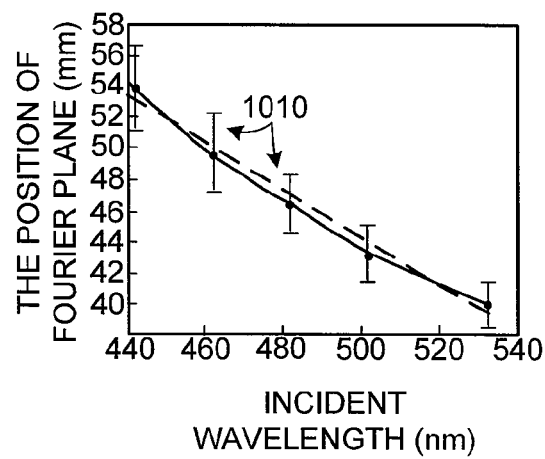
FIG. 10 is a diagram showing the optimal variation of the position of a detector used in the lens-less spectrometer of FIG. 2 with respect to incident wavelengths.

The error bars 1010 shown in FIG. 10 represent the range of the position of the Fourier plane with less than 10% broadening of the minimum FWHM of the crescent. The variation of the position of the optimal Fourier plane with wavelength (e.g., the solid curve in FIG. 10) can be approximated with a linear function (e.g., the dashed line in FIG. 10 with minimum error (less than 5%) in the entire wavelength range), although the variation is not completely linear. Thus, the optimal CCD positions for all wavelengths can be satisfied with minimum error by carefully adjusting the tilt angle ($\Phi$) of the CCD 220 according to the slope of the dashed line in FIG. 10.

To demonstrate the effect of the incident wavelength on the performance of one embodiment of a lens-less Fourier transform volume holographic spectrometer 200, the setup in FIG. 2 (with monochromator 240 and the rotating diffuser 250 present) with CCD 220 tilted by $\Phi$=50° is used and the input wavelength is scanned from $\lambda$=482 nm to $\lambda$=582 nm with 5 nm spacing which is controlled by the monochromator 240 with full width at half maximum (FWHM) resolution equal to 8 nm.

Figure 11:
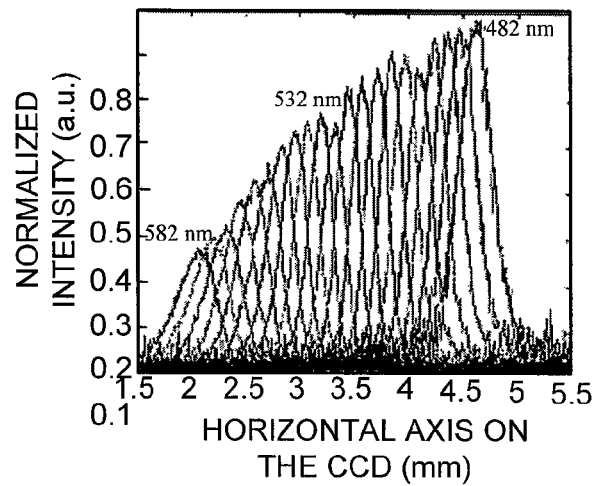
FIG. 11 is a diagram showing a normalized intensity received by a detector from FIG. 2 versus the location of the detector along a horizontal axis when the detector is rotated by a close-to-optimal angle.

The light intensity at all points in the output plane for each incident wavelength is captured using the CCD 220. Note that the optimal tilt angle calculated using the results in FIG. 10 is $\Phi$=79°. However, due to the properties of the CCD 220 and the setup in FIG. 2, $\Phi$=50° is used, which is not optimal but it gives acceptable results. The normalized output intensity (e.g., the output intensity divided by the input intensity) with respect to the location in the horizontal axis on the CCD 220 is shown in FIG. 11 (with $\Phi$=50° and $d_3$=4.0 cm). The hologram 210 is read by a diffuse light (using the rotating diffuser 250) with a single wavelength.

Each curve in FIG. 11 corresponds to one incident wavelength. FIG. 11 clearly shows that the output spatial intensity pattern is a function of the incident wavelength under spatially incoherent light illumination. Note that the peak of the normalized intensity is different for different wavelengths because the efficiency of partial Bragg matching from the SBVH 210 depends on the wavelength. These curves can be made more similar by optimizing the recorded hologram 210.

For example, the operation spectrum range which depends on the properties of the recording material and the recording beams can be further extended by changing the design parameters such as the divergence angle of the recording spherical wave. Further increase in this range can be achieved by simply rotating the SBVH 210. Any complex hologram with desired properties could be recorded without adding complexity to the spectrometer, since a hologram and a CCD make up the lens-less spectrometer. Such a spectrometer can therefore be used for designing a special purpose spectrometer with considerable design flexibility.

Nevertheless, FIG. 11 shows that an embodiment of a lens-less spectrometer 200 in accordance with the present disclosure is capable of separating wavelength channels of a diffuse input signal without requiring a lens external to a sophisticated hologram of the spectrometer, and by tilting the CCD 220, the dependence of the resolution on the incident wavelength (e.g., the widths of the peak at different wavelength) can be minimized.

Figure 12:
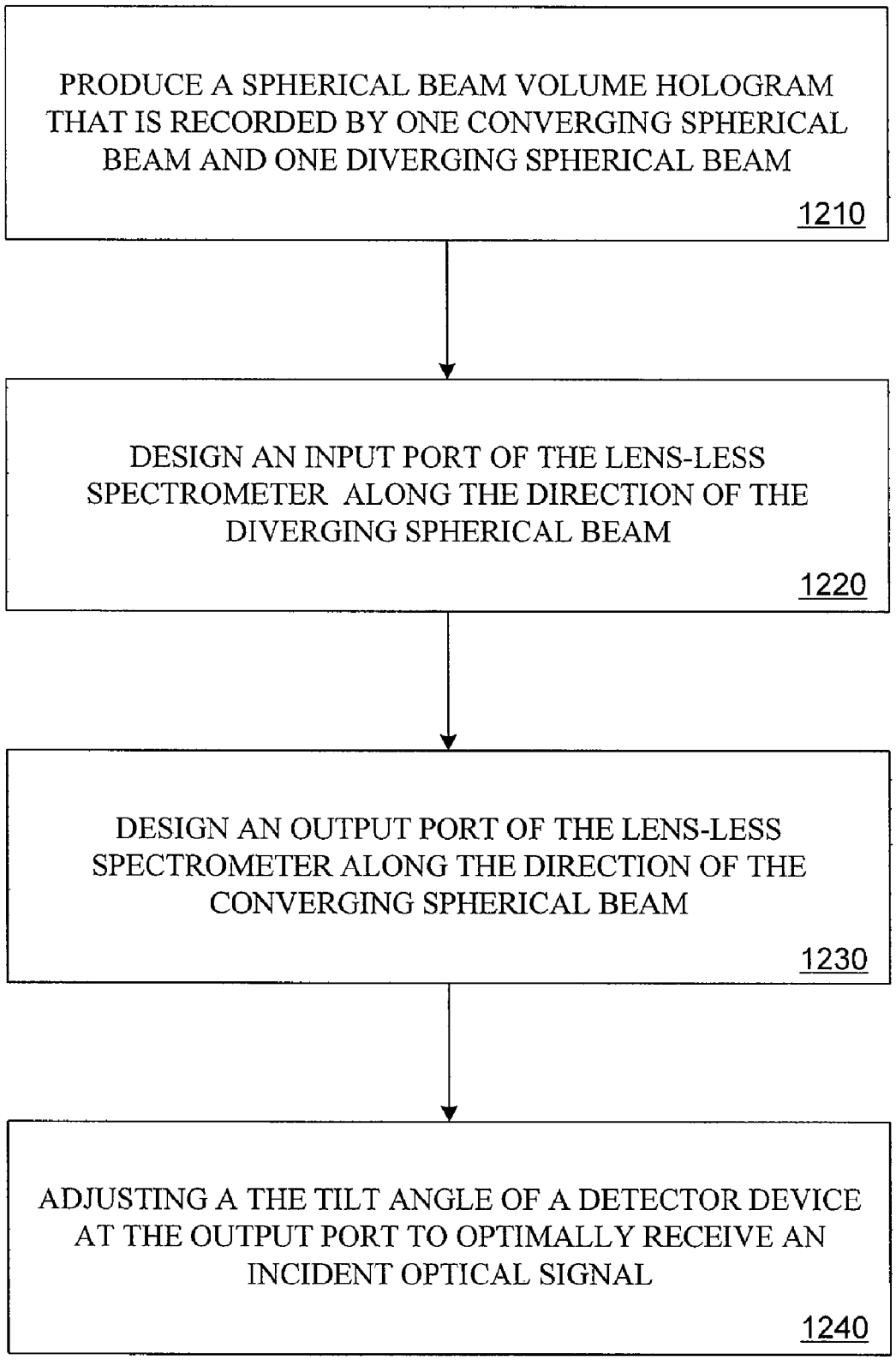
FIG. 12 is a flow chart describing one embodiment of a method for implementing a lens-less spectrometer of FIG. 2.

Referring to FIG. 12, a flow chart describing one embodiment of a method for implementing a lens-less spectrometer is described. The method includes the step of producing (1210) a spherical beam volume hologram that is recorded by one converging spherical beam and one diverging spherical beam. The optical components (e.g., the collimator, the wavelength dispersion medium, and the collector) of a conventional spectrometer may be integrated in a single volume hologram that is produced in the aforementioned step.

Further, the input port of the lens-less spectrometer is designed (1220) along the direction of the diverging spherical beam and the output port is designed (1230) along the direction of the converging spherical beam. As a result, a lens-less spectrometer is composed of only one volume hologram and one detector array (or a camera), in one embodiment. By adjusting (1240) the tilt angle of a detector device at the output port, the lens-less spectrometer may be aligned to optimally receive an incident optical signal.

As previously mentioned, key advantages of one or more embodiments of a lens-less spectrometer include compact size, less complexity, less alignment sensitivity, reduced cost, and more design flexibility. Also, throughput may be increased without sacrificing resolution because only a hologram and a CCD are used for this spectrometer (no lens in the system), in some embodiments. Further, the functionality of optical components of a conventional spectrometer can be implemented or integrated in a single volume hologram of the an embodiment of the present system without adding any complexity to the resulting lens-less spectrometer for one embodiment. Thus, a lens-less spectrometer may perform the same work as conventional spectrometers, such as those involving imaging systems.

Likewise, since only a hologram and a CCD are required for one embodiment of a lens-less spectrometer, the spectrometer can be made very compact and much less expensive to manufacture (no lens in the system, and less alignment sensitivity compared to conventional spectrometers). Further, attachments available for conventional spectrometers may be used with lens-less spectrometers of the present disclosure.

Additionally, optimal holograms either in the form of one hologram or multiplexed holograms can be recorded using a multiple-beam arrangement or diffractive optical elements. Thus, optimal holograms used in embodiments of the lens-less spectrometer are not limited to only spherical beam holograms. In general, the hologram choice is not limited to a spherical beam volume hologram, and more sophisticated hologram can be recorded for the optimization of the spectrometer. The recording can be performed using two recording beams or using one beam that is passed through a diffractive optical element to generate the optical pattern needed to record the hologram. Furthermore, the hologram can be recorded a variety of holographic materials (photorefractive, photopolymer, glass, etc.) and using a variety of laser light source for recording depending on the material response (ultraviolet, visible, infrared).

Overall, embodiments of the lens-less spectrometer can be widely used in any application where the compactness, portability, and the low-cost are the top concerns. One commercial use for such a spectrometer is in teaching and research labs. Further, a portable, compact, inexpensive, and efficient spectrometer is widely required in biological and environmental sensing applications. With the lens-less Fourier-transform technique, such an ultra-compact spectrometer may detect weak spatially incoherent signals in biological and environmental sensing applications, such as the scattering information or Raman signals from biological objects. Another beneficial use for such a spectrometer is in blood alcohol and glucose characterizations (in biological sensing applications) as well as for characterizations of especial hazardous gases in air (in environmental sensing applications).

Any process descriptions or blocks in flow charts should be understood as possibly including one or more steps in the process, and alternate implementations are included within the scope of present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A method of implementing a lens-less spectrometer, comprising the steps of:
   producing a spherical beam volume hologram that is recorded by one converging spherical beam and one diverging spherical beam, the spherical beam volume hologram capable of performing a Fourier-transformation on an incident optical signal without aid of an external lens;
   positioning an input port of the lens-less spectrometer along a direction of the diverging spherical beam; and
   positioning an output port of the lens-less spectrometer along a direction of the converging spherical beam.

2. The method of claim 1, further comprising the step of:
   tilting a detector device at the output port at an angle with respect to normal to propagation diffraction of a diffracted beam so that the detector device receives optimal spectral resolution over a spectral operating bandwidth.

3. The method of claim 1, wherein the spherical beam volume hologram is comprised of a photopolymer material.

4. The method of claim 1, wherein the spherical beam volume hologram is comprised of a glass material.

5. The method of claim 1, wherein the spherical beam volume hologram is comprised of a photorefractive material.

6. The method of claim 1, wherein the converging spherical beam adds a quadratic phase term to a diffracted signal for performing Fourier-transformation.

7. The method of claim 6, further comprising the step of:
   capturing a diffracted signal pattern at a focal plane of the recording converging spherical beam.

8. The method of claim 1, further comprising the step of:
   extending operation spectrum range of the lens-less spectrometer by changing an angle of divergence for the divergence spherical beam used to record the spherical beam volume hologram.

9. The method of claim 1, further comprising the step of:
   using the lens-less spectrometer to detect weak spatially incoherent signals in scattering information from biological objects.

10. The method of claim 1, further comprising the step of:
    positioning a detector at the output port to receive diffracted light from a direction of the recording converging spherical beam.

11. The method of claim 10, wherein the detector is tilted at an angle that is determined to measure a spectrum with an optimal resolution, determination of the tilt angle based upon properties of the volume hologram and an optimal location of the output Fourier plane at different wavelengths.

12. The method of claim 1, wherein the spherical beam volume hologram performs functions of a slit, a collimator, a dispersive medium, and a collector.

13. The method of claim 1, wherein the spherical beam volume hologram is replaced by a series of multiplexed holograms.

14. The method of claim 1, wherein the spherical beam volume hologram is replaced by a sophisticated optimal hologram.

* * * * *